United States Patent
Gnanamani et al.

(10) Patent No.: US 9,189,847 B2
(45) Date of Patent: Nov. 17, 2015

(54) 2D VISUALIZATION FOR RIB ANALYSIS

(71) Applicant: SIEMENS AKTIENGESELLSCHAFT, Munich (DE)

(72) Inventors: Murali Tharan Gnanamani, Erlangen (DE); Sven Kohle, Erlangen (DE); Grzegorz Soza, Heroldsberg (DE); Andreas Wimmer, Forchheim (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 177 days.

(21) Appl. No.: 14/077,293

(22) Filed: Nov. 12, 2013

(65) Prior Publication Data

US 2015/0131881 A1    May 14, 2015

(51) Int. Cl.
*G06K 9/00* (2006.01)
*G06T 7/00* (2006.01)
*G06T 15/10* (2011.01)

(52) U.S. Cl.
CPC ........... *G06T 7/0012* (2013.01); *G06T 15/10* (2013.01); *G06T 2207/10081* (2013.01); *G06T 2207/20048* (2013.01); *G06T 2207/30012* (2013.01); *G06T 2215/06* (2013.01)

(58) Field of Classification Search
None
See application file for complete search history.

(56) References Cited

U.S. PATENT DOCUMENTS

| | | | |
|---|---|---|---|
| 2005/0234448 A1* | 10/2005 | McCarthy | 606/57 |
| 2007/0249910 A1* | 10/2007 | Kiraly et al. | 600/300 |
| 2012/0106810 A1* | 5/2012 | Ramakrishnan et al. | 382/128 |
| 2013/0070996 A1 | 3/2013 | Comaniciu | |
| 2013/0077841 A1 | 3/2013 | Comaniciu | |
| 2013/0101197 A1* | 4/2013 | Kaftan et al. | 382/131 |
| 2013/0136322 A1 | 5/2013 | Dewan | |

* cited by examiner

*Primary Examiner* — Amara Abdi
(74) *Attorney, Agent, or Firm* — Harness, Dickey & Pierce, P.L.C.

(57) ABSTRACT

An embodiment of the invention relates to a method of visualization, wherein a 2D transformed image is generated based on 3D image data. A corresponding computation unit, a system including a computation unit and a displaying unit, a medical imaging device, and a computer program are also disclosed. The method of visualization of an embodiment includes receiving 3D image data representing at least a portion of a spine and a plurality of ribs; and generating a 2D transformed image based on the three-dimensional image data, the 2D transformed image representing the plurality of ribs and the portion of a spine in a straightened configuration, and the angle of rotation of at least one of the ribs around its long axis being selected from a plurality of angles. Selecting an angle of rotation from a plurality of angles allows selecting the perspective for viewing the ribs in the 2D transformed image.

21 Claims, 10 Drawing Sheets

2D VISUALIZATION FOR RIB ANALYSIS

CO-PENDING APPLICATION STATEMENT

The present application is co-pending with U.S. application entitled "Rib Labeling For 2D Images" to Soza et al., U.S. application Ser. No. 14/077,289 filed on even date herewith on Nov. 12, 2013, the entire contents of which are hereby incorporated herein by reference.

FIELD

The present invention relates generally to the field of medical imaging, and, more particularly, to a two-dimensional ("2D") visualization for rib analysis.

BACKGROUND

High-resolution computed tomography ("CT") volumes of the chest are commonly used to diagnose abnormalities in the ribs. Current technology provides CT volumes of the chest with up to several hundred 2D slices. Thorough evaluation of thoracic CT scans frequently requires physicians to identify and track the individual ribs structures in the volume data. This can be a tedious task as the ribs occupy multiple slices within the data. More precisely, the ribs typically cross through the axial planes at an oblique angle, thereby making their examination even more problematic. To analyze the CT volumes, the radiologist must scroll through all slices, and view the contents of the ribs while tracking the ribs through each slice. Moreover, given a rib in an arbitrary slice, the radiologist must scroll up and down to determine the number of the rib.

Current technology also provides a method of visualization by means of straightening each of a plurality of ribs in the volume data based on a centerline in each of the plurality of ribs and generating a 2D image based on the straightened ribs. By generating these 2D images, the tedious task of reading the volume data is simplified by reading 2D images representing the ribs in a straightened configuration. Despite these improvements current technology offers only very limited possibilities for changing viewing parameters such as the perspective for viewing the ribs in 2D images.

SUMMARY

In at least one embodiment of the invention a method of visualization is disclosed, wherein a 2D transformed image is generated based on three-dimensional ("3D") image data. In at least one embodiment a corresponding computation unit, a system including a computation unit and a displaying unit, a medical imaging device, and a computer program are also disclosed. The 3D image data is previously recorded by use of a medical imaging device, e.g. by use of a magnetic resonance imaging ("MRI") system, an X-ray system, a positron emission tomography ("PET") system or any other medical imaging device. In a preferable embodiment of the invention the 3D image data is previously recorded by way of a CT system. In further embodiments of the inventions contrast agents such as iodide-containing solution or radioactive tracers can be employed for recording measuring data. It is understood, that the term "3D image data" refers to image data reconstructed from measuring data.

According to a first embodiment of the invention, the method of visualization comprises receiving 3D image data representing at least a portion of a spine and a plurality of ribs, generating a 2D transformed image based on the 3D image data, the 2D transformed image representing the plurality of ribs and the portion of a spine in a straightened configuration, the angle of rotation of at least one of the ribs around its long axis being selected from a plurality of angles. Selecting an angle of rotation from a plurality of angles allows for selecting the perspective for viewing the ribs in the 2D transformed image. Thus the suggested method provides means for analyzing individual ribs in a fast and simple manner from different perspectives. As a result the invention increases the speed and reliability of the reading workflow.

At least one embodiment of the invention can also be realized as a computation unit for visualization, comprising a program memory for storage of program code, the program code being present in the program memory and carrying out, when executed, receiving 3D image data representing at least a portion of a spine and a plurality of ribs, generating a 2D transformed image based on the 3D image data, the 2D transformed image representing the plurality of ribs and the portion of a spine in a straightened configuration, the angle of rotation of at least one of the ribs around its long axis being selected from a plurality of angles. At least one embodiment of the invention can also be realized as a medical imaging device comprising such a computation unit.

At least one embodiment of the invention can also be realized as a non-transitory computer readable medium including program segments for, when executed on a computer device, causing the computer device to carry out the inventive method. At least one embodiment of the invention can also be realized as a computer program product, comprising program code segments of a computer program stored on a non-transitory computer-readable data carrier to execute at least one embodiment of the inventive method when the computer program is executed on a computer.

At least one embodiment of the invention can also be realized as a system including a computation unit and a displaying unit for visualization, wherein the computation unit comprises a program memory for storage of program code, the program code being present in the program memory and carrying out, when executed, receiving 3D image data representing at least a portion of a spine and a plurality of ribs, generating a 2D transformed image based on the 3D image data, the 2D transformed image representing the plurality of ribs and the portion of a spine in a straightened configuration, the angle of rotation of at least one of the ribs around its long axis being selected from a plurality of angles, wherein the displaying unit is configured to receive the transformed image from the computation unit and wherein the displaying unit is further configured to display the transformed image. Such a computation unit can also be configured to obtain instructions via a user-interface. According to another embodiment of the invention, the computation unit is acting as a server and the displaying unit is acting as a client, wherein the displaying unit is configured to receive the 2D image from the computation unit via a network connection.

BRIEF DESCRIPTION OF THE DRAWINGS

The invention is explained in greater detail below on the basis of an example embodiment. Wherein.

DETAILED DESCRIPTION OF THE EXAMPLE EMBODIMENTS

Figure 1:
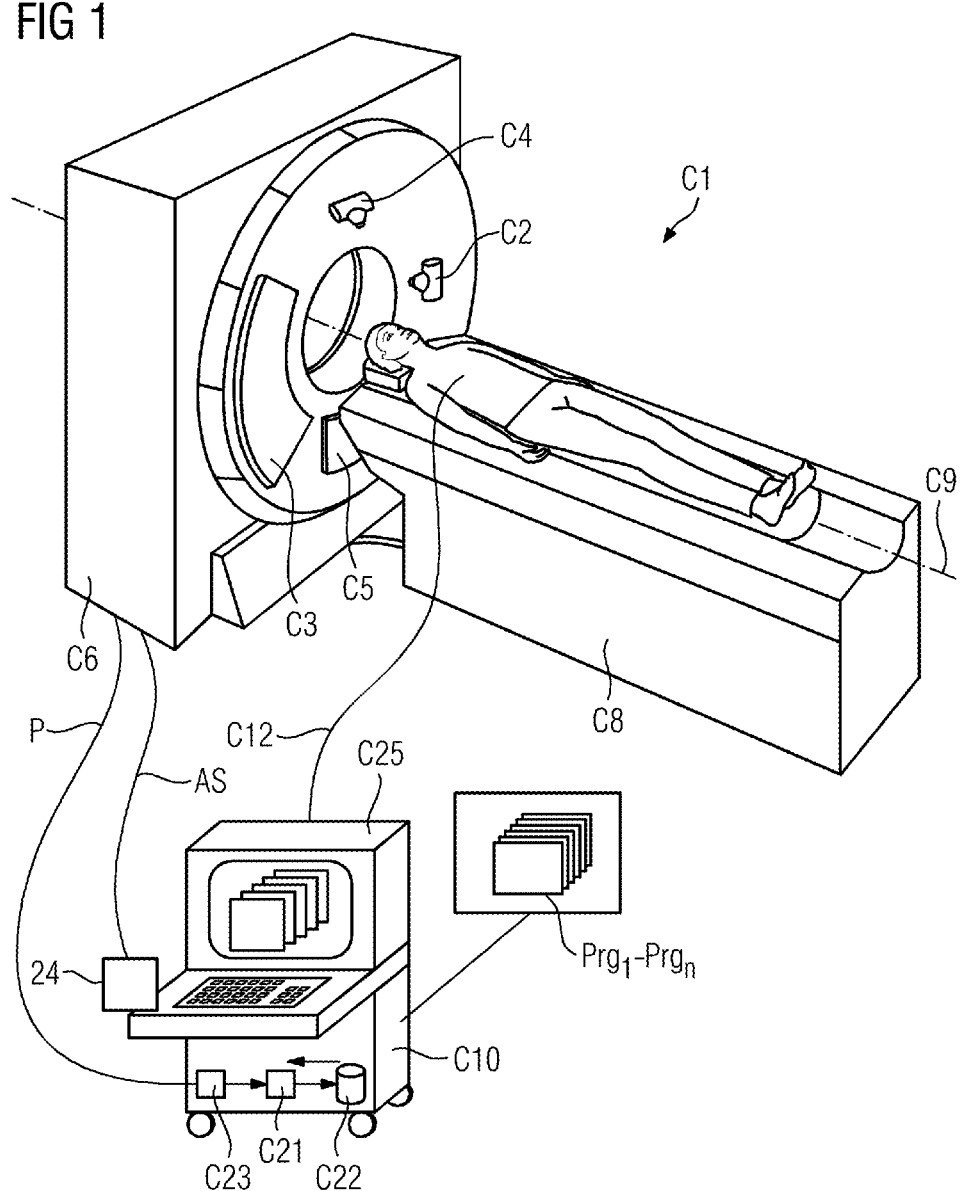
FIG. 1: shows a first representation of an example embodiment of a medical imaging device with a computation unit.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of descriptions to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

According to an embodiment of the invention, the inventive method comprises receiving a centerline of the portion of a spine and receiving a centerline of each of the plurality of ribs, and determining a correspondence based on the relative position of the centerline of the portion of a spine and of the centerline of at least one of the plurality of ribs, the correspondence being used to generate the 2D transformed image. Different steps of image processing such as segmentation and rendering can be employed for extracting the centerlines based on the 3D image data. Determining the correspondence based on the centerlines allows generating a 2D transformed image representing the anatomical relationship between the different ribs and/or the spine, respectively, in a very precise manner.

According to an embodiment of the invention, the correspondence is calculated by determining correspondence points, each correspondence point connecting one of the plurality of ribs with the portion of a spine. Determining correspondence points is a very reliable and precise way for generating an anatomically meaningful 2D transformed image. Hence the inventive method provides 2D transformed images which can be read fast and interpreted easily.

According to an embodiment of the invention, the inventive method comprises receiving a centerline of the portion of a spine and receiving a centerline of each of the plurality of ribs, and determining the long axis of a rib in the straightened configuration based on the centerline of the respective rib. This approach allows for determining the long axis of a rib in a very fast manner and provides, furthermore, a very meaningful definition of the angle of rotation.

According to an embodiment of the invention, the inventive method comprises receiving a centerline of the portion of a spine and receiving a centerline of each of the plurality of ribs, the centerlines of the plurality of ribs being parallel to each other in the straightened configuration, and the centerline of the portion of a spine and the centerlines of the plurality of ribs being perpendicular to each other in the straightened configuration. This approach provides 2D transformed images which can be read and interpreted particularly fast and easily.

According to an embodiment of the invention, the angle of rotation is the same for all ribs in the 2D transformed image. According to a further embodiment of the invention the inventive method comprises generating a multitude of 2D transformed images, the angle of rotation being the same for all ribs in one of the 2D transformed images, the angle of rotation being different in different 2D transformed images. Ordering these different 2D transformed images according to the angle of rotation allows for generating a sequence of 2D transformed images, wherein the sequence can be displayed as a movie. Viewing the ribs from different angles of rotation makes it particularly easy to diagnose abnormalities, e.g. lesions, which are more easily visible under a particular angle of rotation compared to other angles of rotation.

According to an embodiment of the invention, the inventive method comprises generating a multitude of 2D transformed images, each of the 2D transformed images representing the portion of a spine and the plurality of ribs with the same orientation. The 2D transformed images can have different properties apart from the orientation, e.g. the angles of rotation of the ribs, the contrast, the visualization filter, and even a multitude of properties can differ. Furthermore the multitude of 2D transformed images can form a stack of images.

According to an embodiment of the invention, at least some of the multitude of 2D transformed images represent the portion of the spine and the plurality of ribs shifted towards the anterior or posterior direction, so that it is particularly easy to access diagnostically relevant views of the rib cage.

According to an embodiment of the invention, the inventive method comprises generating a 2D reformatted image based on the 3D image data, the 2D reformatted image representing a cross section of at least a part of the portion of a spine and the plurality of ribs. These 2D reformatted images can be generated by way of a visualization filter such as maximum-intensity-projection, multi-planar-reformation or curved-planar-reformation. Displaying the 2D reformatted image together with the transformed image provides additional information and, thus, makes the procedure of interpreting the transformed image faster and more reliable.

According to an embodiment of the invention, the inventive method comprises determining a correspondence between image elements of the 2D transformed image and of the reformatted image. If the 2D transformed image and the 2D reformatted image are displayed simultaneously, the correspondence in the 2D transformed image and in the 2D reformatted image can be visualized. Such visualization improves the workflow of reading the transformed image, because it allows highlighting regions within the images.

According to an embodiment of the invention, the inventive method comprises generating a first, anatomical label for each of the ribs represented in the 2D transformed image, wherein these first labels are placed outside the ribs in the transformed image, so that it becomes particularly easy to identify the position of individual ribs in the transformed image.

According to an embodiment of the invention, the inventive method comprises generating a second label for highlighting an image-based feature of at least one of the ribs in the reformatted image. Such an image-based feature can be an intensity distribution indicating a lesion of a rib.

At least one embodiment of the invention can also be realized as a computation unit for visualization, comprising a program memory for storage of program code, the program code being present in the program memory and carrying out, when executed, receiving 3D image data representing at least a portion of a spine and a plurality of ribs, generating a 2D transformed image based on the 3D image data, the 2D transformed image representing the plurality of ribs and the portion of a spine in a straightened configuration, the angle of rotation of at least one of the ribs around its long axis being selected from a plurality of angles. At least one embodiment of the invention can also be realized as a medical imaging device comprising such a computation unit.

At least one embodiment of the invention can also be realized as a non-transitory computer readable medium including program segments for, when executed on a computer device, causing the computer device to carry out the inventive method. At least one embodiment of the invention can also be realized as a computer program product, comprising program code segments of a computer program stored on a non-transitory computer-readable data carrier to execute at least one embodiment of the inventive method when the computer program is executed on a computer.

At least one embodiment of the invention can also be realized as a system including a computation unit and a displaying unit for visualization, wherein the computation unit comprises a program memory for storage of program code, the program code being present in the program memory and carrying out, when executed, receiving 3D image data representing at least a portion of a spine and a plurality of ribs, generating a 2D transformed image based on the 3D image data, the 2D transformed image representing the plurality of ribs and the portion of a spine in a straightened configuration, the angle of rotation of at least one of the ribs around its long axis being selected from a plurality of angles, wherein the displaying unit is configured to receive the transformed image from the computation unit and wherein the displaying unit is further configured to display the transformed image. Such a computation unit can also be configured to obtain instructions via a user-interface. According to another embodiment of the invention, the computation unit is acting as a server and the displaying unit is acting as a client, wherein the displaying unit is configured to receive the 2D image from the computation unit via a network connection.

FIG. 1 initially represents a first medical imaging device C1 with a processing unit C21. The medical imaging device here takes the form of a CT device of the so-called third generation, to which embodiments of the invention are, however, not restricted. In the gantry housing C6 is located a closed gantry, which is not shown here, on which are arranged a first X-ray tube C2 with an oppositely located detector C3. Optionally, a second X-ray tube C4 with an oppositely located detector C5 is arranged in the CT system shown here, so that by way of the tube unit/detector combination additionally available here, a higher temporal resolution can be achieved, or with the use of different X-ray energy spectrums in the tube unit/detector systems, "Dual-Energy" investigations can also be performed.

The CT system C1 further has a patient couch C8, upon which during the investigation a patient can be advanced along a system axis C9, also designated the z axis, into the measuring field, wherein the scanning itself can take place both as a pure circular scan without advancement of the patient exclusively in the area of investigation of interest. The movement of the patient couch C8 relative to the gantry is effected by means of suitable motorization. During this movement the X-ray source C2 or C4 respectively rotates around the patient. The detector C3 or C5 respectively travels in parallel opposite the X-ray source C2 or C4, in order to capture projection measurement data, which is then used for the reconstruction of cross sections.

As an alternative to a sequential scan, in which the patient is advanced gradually between the individual scans through the area of investigation, the possibility of a spiral scan also of course exists, in which the patient is continuously advanced along the system axis C9 through the area of investigation between X-ray tube C2 or C4 and detector C3 or C5 during the rotational scanning with the X-rays. As a result of the movement of the patient along the axis C9 and the simultaneous rotation of the X-ray source C2 or C4 respectively, a helical path is yielded in a spiral scan for the X-ray source C2 or C4 respectively relative to the patient during the measurement. This path can also be achieved by the gantry being moved along the axis C9 with the patient immobile. It is further possible to move the patient continuously and periodically between two points.

The CT system C1 is controlled by a control and computation unit C10 with computer program code Prg1 to Prgn which is present in a memory. It should be pointed out that these computer program codes Prg1 to Prgn can of course also be contained on an external storage medium and loaded into the control and computation unit C10 as required.

Acquisition control signals AS can be transferred from the control and computation unit C10 via a control interface 24, in order to activate the CT system C1 according to certain measurement protocols. The acquisition control signals AS here relate, for example, to the X-ray tubes C2 and C4, wherein stipulations relating to their output and the timing of their activation and deactivation can be made, and the gantry, wherein stipulations relating to its rotation speed can be made, and the advancement of the table.

As the control and computation unit C10 has an input console, measurement parameters can be entered by a user or operator of the CT device C1, which then control the data capture in the form of acquisition control signals AS. The control and computation unit C10 has a displaying unit C25, the displaying unit C25 being configured to receive images from the computation unit. Information about measurement parameters currently being used can be displayed on displaying unit C25; in addition, further information of relevance to the operator can also be displayed.

The projection measurement data or raw data acquired from detector C3 or C5 respectively is transferred to the control and computation unit C10 via a raw data interface. This raw data is then, if appropriate after a suitable initial preparation, further processed in a reconstruction component C23. In this exemplary embodiment the reconstruction component C23 is realized in the control and computation unit C10 in the form of software on a processor. It is further possible that the control of the measuring procedure and the reconstruction are performed by different computation units.

The image data reconstructed by the reconstruction component C23 is then further processed by a processing unit C21 and the resulting images are deposited in a memory C22 of the control and computation unit C10 and/or output on the displaying unit C25 of the control and computation unit C10. The reconstructed image data and the resulting images generated by the processing unit C21 can also be fed into a network connected to the computed tomography system C1 via an interface not shown in FIG. 1, for example a radiological information system (RIS), and stored in a mass storage unit accessible there. The reconstructed image data can also be saved directly in the memory 22, and the processing unit C21 can also access the memory C22.

Figure 2:
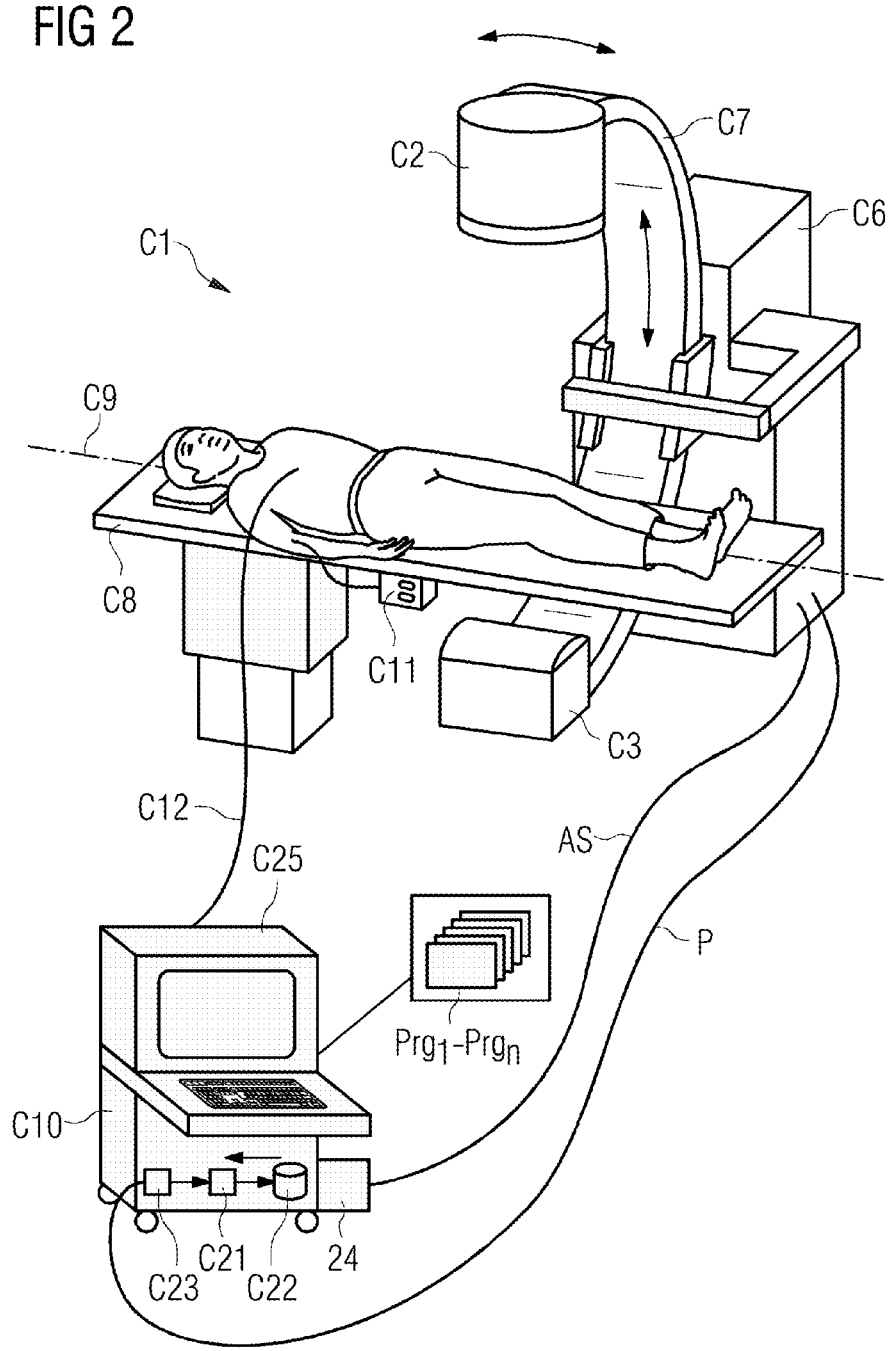
FIG. 2: shows a second representation of an example embodiment of a medical imaging device with a computation unit.

FIG. 2 shows a C-arm system, in which in contrast to the CT system in FIG. 1 the housing C6 carries the C-arm C7, on which on the one hand the X-ray tube C2 and on the other the oppositely located detector C3 are fixed. For scanning purposes, the C-arm C7 is likewise pivoted about a system axis C9, so that scanning from a multiplicity of scanning angles can take place and corresponding projection data can be established from a multiplicity of projection angles. The C-arm system C1 from FIG. 2 has, like the CT system from FIG. 1, a control and computation unit C10 of the kind described with reference to FIG. 1.

The control and computation unit C10 can additionally perform the function of an EKG, wherein a line C12 is used to derive the EKG potential between the patient and control and computation unit C10. In addition the CT system C1 shown in FIG. 2 also has a contrast medium injector C11, via which in addition contrast medium can be injected into the blood stream of the patient, so that for example the vessels of the patient's body, in particular the cardiac chambers of the beating heart, can more effectively be represented. In other embodiments the CT system in FIG. 1 can also be configured to perform the function of an EKG.

Embodiments of the invention can be applied in both of the systems shown in FIG. 1 and FIG. 2. In principle it can also be used for other medical devices such as MRI, PET or a combination thereof.

Figure 3:
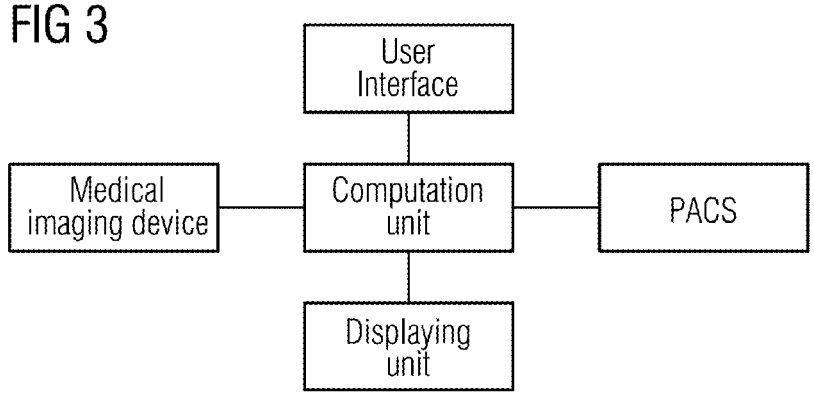
FIG. 3: shows a schematic representation of a medical imaging device with a computation unit.

FIG. 3 shows a schematic representation of a medical imaging device with a computation unit. The computation can be used for visualization as well as for rib labeling and for the visualization of rib labeling. The medical imaging device can comprise an additional computation unit for controlling the medical imaging device. Furthermore the medical imaging device can comprise a reconstruction component for reconstructing the 3D image data. The computation unit comprises a processing unit configured to carry through the computational steps of the claimed method and the variations of the claimed method described in this application. In an embodiment of the invention the computation unit acts as a server, while the displaying unit acts as client. The user interface can also be configured to act as a client. A picture archiving and communication system (PACS) can also be connected with the computation unit for storing and retrieving generated images. In a further embodiment of the invention the PACS is configured to communicate directly with the medical imaging device or the displaying unit. A RIS can also be connected to the medical imaging device or to the computation unit.

Figure 4:
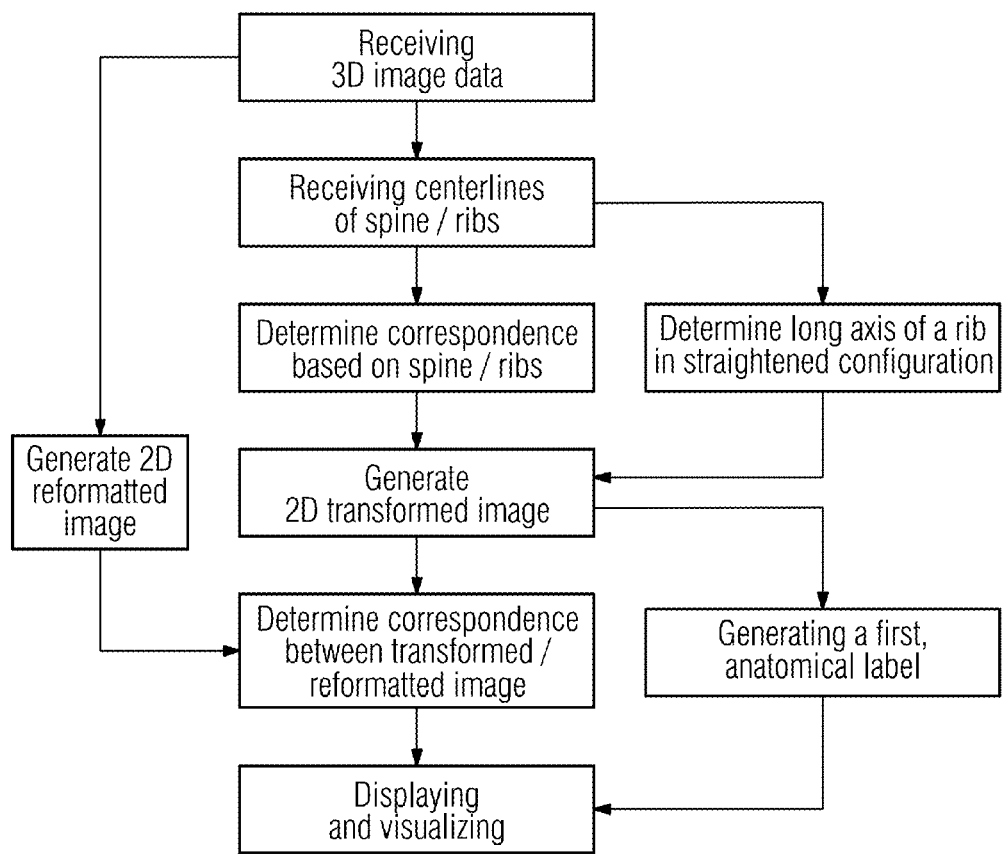
FIG. 4: shows a flowchart of an example embodiment of the inventive method.

FIG. 4 shows a flowchart of an example embodiment of the inventive method. The example embodiment method of visualization comprises the steps of receiving 3D image data representing at least a portion of a spine and a plurality of ribs and generating a 2D transformed image based on the 3D image data. The 3D image data represent typically a portion of a spine and a plurality of ribs which are anatomically connected with each other. The 3D image data represent the ribs and the portion of a spine typically in an anatomical, curved geometry. The 2D transformed image can also be described as a slice with a defined thickness. In an embodiment of the invention the slice thickness is the same for all ribs; in another embodiment of the invention the slice thickness may differ for different ribs within one image. The 2D transformed image represents the plurality of ribs and the portion of a spine in a straightened configuration, wherein the angle of rotation of at least one of the ribs around its long axis has been selected from a plurality of angles.

The 2D transformed image can be generated by way of receiving centerlines of the portion of a spine and of each of the plurality of ribs. These centerlines can be derived from the 3D image data by way of image processing, e.g. segmentation. Additionally a correspondence based on the relative position of the centerline of the portion of a spine and of the centerline of at least one of the plurality of ribs can be used for generating the 2D transformed image. The centerlines and the correspondence can initially be described in 3D image space. In order to represent the portion of a spine and the ribs in a straightened configuration, the centerlines can be transformed into 2D image space, so that all centerlines lie in a single 2D plane. The correspondence can then, accordingly, be described in terms of distances and angles between the centerlines. In an embodiment of the invention the centerlines of the plurality of ribs are oriented parallel to each other in the 2D transformed image, whereas the centerlines of the ribs are oriented perpendicular to the centerline of the portion of a spine. Furthermore, the correspondence can be determined by calculating correspondence points, each correspondence point connecting one of the plurality of ribs with the portion of a spine. Advantageously the correspondence points correlate to individual vertebrates of the portion of a spine, so that the 2D transformed image is anatomically particularly meaningful.

The long axis of each of the plurality of ribs can be determined based on the centerline of each of the plurality of ribs. According to an embodiment of the inventive method at least one of the ribs is displayed with a selectable angle of rotation around its long axis. All of the plurality of ribs may be displayed with the same angle of rotation. In an embodiment of the invention the angle of rotation can be selected by a user, e.g. via a graphical user-interface. In another embodiment the angle of rotation is selected semi-automatically, e.g. first a range of angles of rotation is pre-selected by a user. Then a plurality of 2D transformed images can be generated, wherein each of the 2D transformed images displays the plurality of ribs with a different angle of rotation, the angle of rotation being one of the angles of rotation from the pre-selected range. The plurality of 2D transformed images can also be displayed as a movie and/or saved as a stack of images, so that a user can scroll through this stack and analyze the plurality of ribs from different perspectives.

Additionally a 2D reformatted image can be generated based on the 3D image data, the 2D reformatted image representing a cross section of at least a part of the portion of a spine and the plurality of ribs. Displaying such a 2D reformatted image simultaneously with the 2D transformed image and visualizing a correspondence between the 2D reformatted image and the transformed image in both images is particularly advantageous. It may be easier to detect an abnormality like a lesion in the 2D transformed image, but the 2D reformatted image may provide information according to the 3D geometry. Thus highlighting a lesion in the 2D reformatted image, wherein the lesion has been detected in the 2D transformed image, can provide valuable additional information. In an embodiment of the invention a region in the 2D transformed image is highlighted first, e.g. by a user via a graphical user-interface, and then the corresponding region is highlighted in the 2D reformatted image.

As an additional feature each of the plurality of ribs can be labeled in the 2D transformed image. In yet another embodiment of the invention each of the plurality of ribs in the 2D reformatted image is labeled, too. Such labeling comprises in particular generating anatomical labels, e.g. by numbering each of the plurality of ribs according the anatomical convention. It is advantageous to place the anatomical labels outside the rib cage, so that the labels do not occlude the ribs.

In an embodiment of the invention the centerlines of each of the plurality of ribs ("rib centerlines Rj") and the centerline of at least a portion of the spine ("spine centerline S") are employed for generating the 2D transformed image. Upon segmentation of the portion of a spine in the 3D image data the centerline S can be approximated with an ordered list of L centerline points $S_i$, $1 \leq i \leq L$. Each of the M rib centerlines Rj with $1 \leq j \leq M$ can be approximated with an ordered list of Nj centerline points $p_{j,k}$ with $1 \leq k \leq N_j$. The centerline points $S_i$ and $p_{j,k}$ can be spaced equidistantly (along the dimension of the index k, respectively). Methods to compute the rib centerlines Rj were disclosed in U.S. Pat. No. 7,627,159B2, methods to compute the spine centerline S were disclosed in US20130136322A1, the entire contents of each of which are incorporated herein by reference. Each rib centerline point $p_{j,k}$ is associated with an up-vector $u_{j,k}$ which is parallel to the long axis of the elliptical rib cross section and oriented upwards (i.e. cranial). Method to compute up-vectors were disclosed in US20130070996A1, the entire contents of which are incorporated herein by reference.

Figure 5:
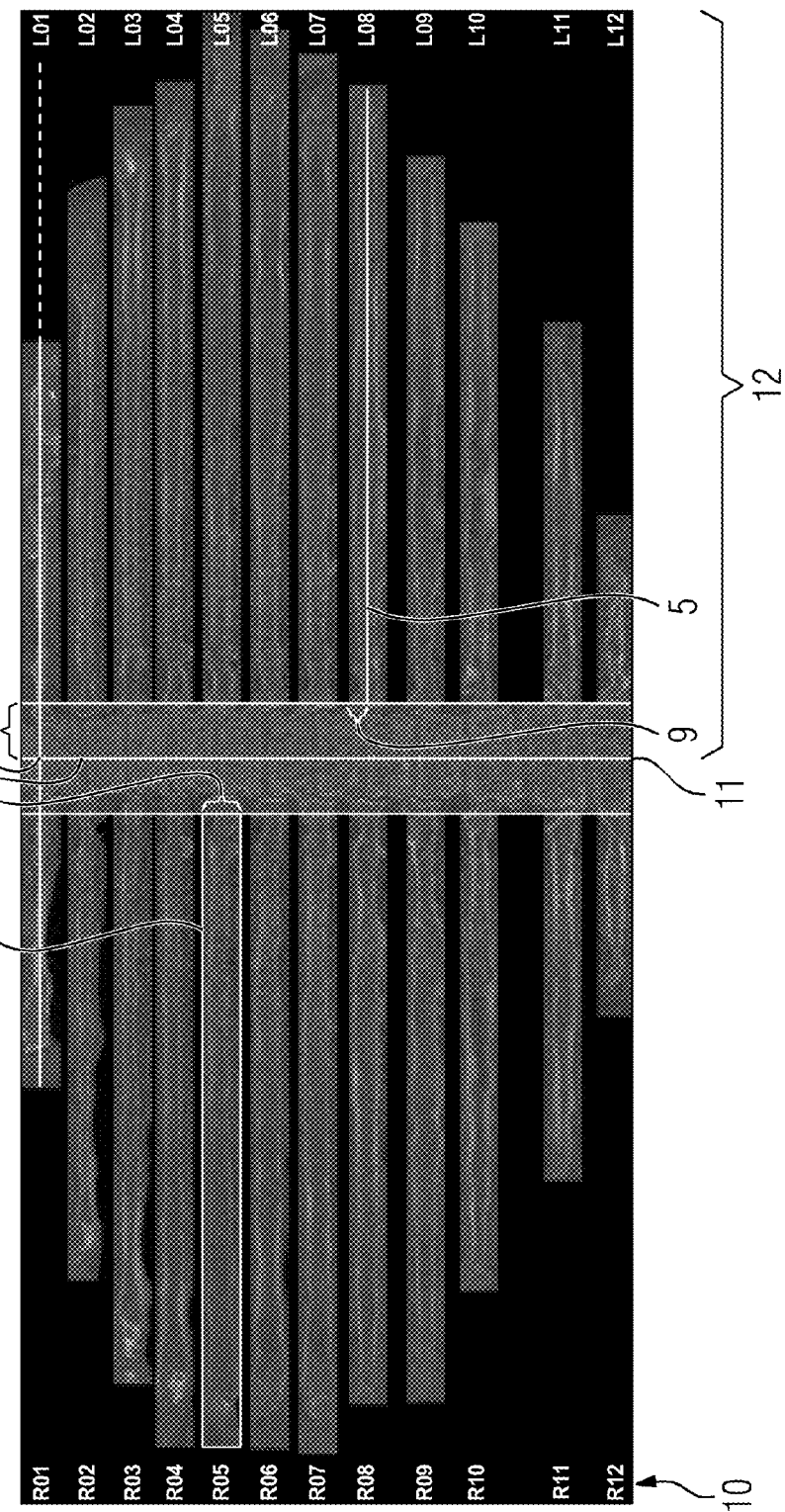
FIG. 5: shows an example layout of the 2D transformed image.

FIG. 5 shows an example layout of the 2D transformed image. In the example shown here, the spine centerline 4 is placed as vertical line at the horizontal center of the image, whereby the width of the image is chosen at least twice the maximum length of rib centerlines 12. The ribs are ordered by their anatomical label 10 and arranged in increasing order from top to bottom. The anatomical labels are located at the same height as the respective rib centerlines 5, wherein the height is measured along the spinal column, e.g. along the spine centerline 4 in the straightened configuration.

In the example shown here an elongated rib centerline is indicated by a dashed line. Each rib in the 2D transformed image has a correspondence point 7 where it is attached to the spine centerline 4. A rib diameter 8 can be defined for displaying purpose, e.g. in terms of millimeters. The rib diameter 8 may be given by twice the rib radius 9 which covers the long axis of the elliptical rib cross section. The rib radius 9 may be determined for each rib individually, since the topmost ribs are smaller than the bottommost ribs and the rib height may also vary from patient to patient.

In a similar manner, a spine diameter and a spine radius 3 may be defined, e.g. in millimeters. The spine diameter may be given by the distance which covers the extension of the vertebrae in a predefined direction, e.g. in the horizontal direction in the straightened configuration or in the frontal plane. Since the size of the vertebrae increases cranial to caudal, an individual spine diameter may be chosen for each vertebra or patient. The rib bounding box 6 indicates the edges of a rib in the 2D transformed image. The rib bounding box 6 is derived from the rib diameter 8 and the length of the rib centerline 5 outside of the spine 3. Parameters such as the rib radius 9, the spine radius 3 or the rib bounding box 6 may be used for generating the 2D transformed image.

Figure 6:
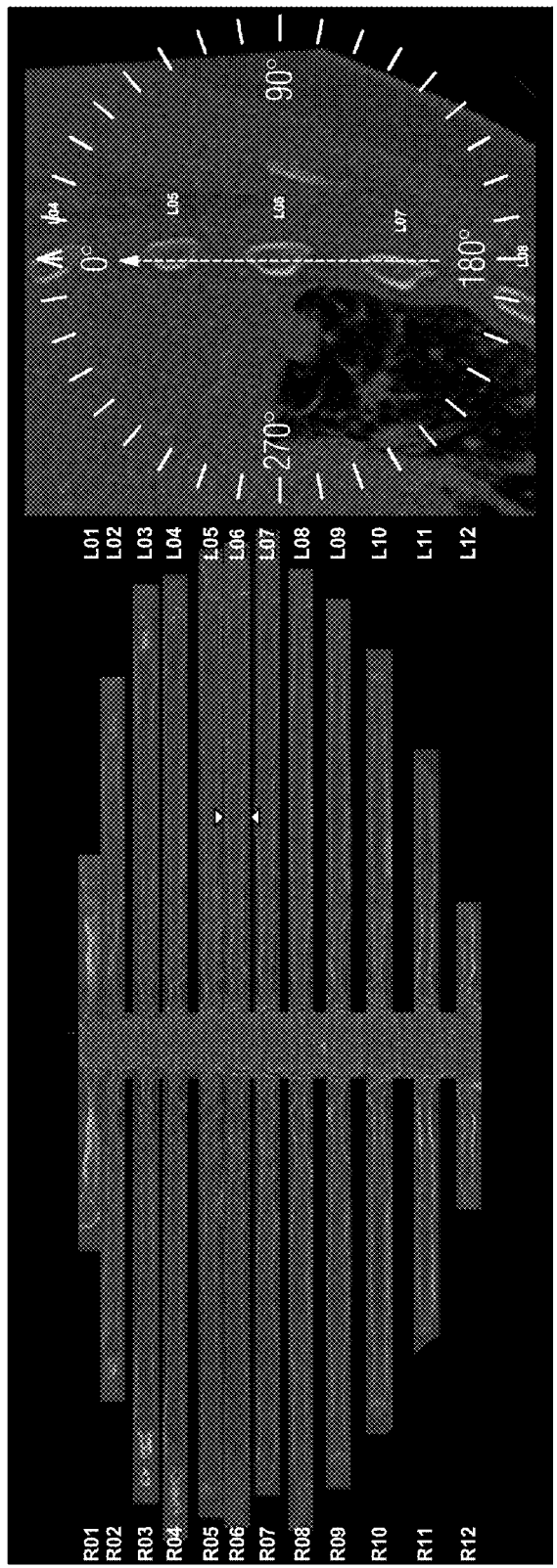
FIG. 6: shows an example visualization of the angle of rotation.

FIG. 6 shows an example visualization of the angle of rotation. The left side of FIG. 6 shows an example of a 2D transformed image with labels in the shape of arrows indicating the position for generating a cross section, whereas the right side of FIG. 6 shows the corresponding cross section. While the 2D transformed image represents the ribs in a straightened configuration, the cross section represents the ribs in an anatomical or curved configuration. The elongated error in the cross section is oriented parallel to the up vector of the central rib labeled "L06" and indicates, therefore, the angle of rotation of the central rib. In the example shown here, the angle of rotation is 0 degrees. The angular scale is defined with respect to a global (or "world") coordinate system. Selecting the angle of rotation of a rib results, thus, in selecting a certain perspective for displaying the respective rib in the straightened configuration.

Figure 7:
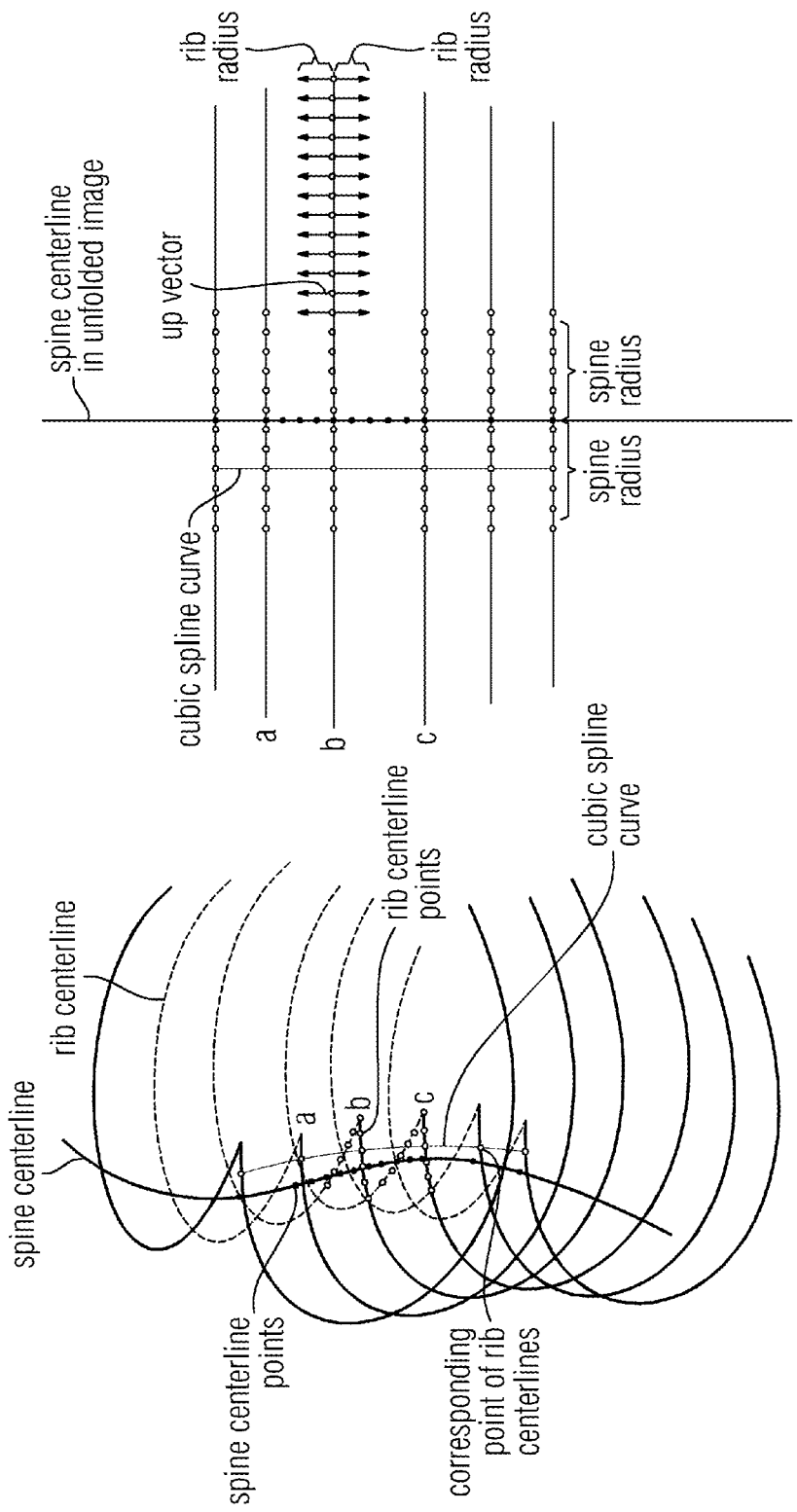
FIG. 7: shows a scheme of a portion of a rib cage in a 3D configuration and in the straightened configuration.

The principle of rendering the portion of a spine and the plurality of ribs is illustrated in FIG. 7. For rendering the portion of a spine a curve, e.g. a cubic spline curve, is fitted through points of the extended rib centerlines Rj, wherein the points belong to different ribs. For fitting those points are used, which correspond to each other, meaning that two rib centerline points with different index value j are described by the same index value k. Along such a fitted curve intensity values are sampled from the 3D image data and mapped into the straightened configuration, e.g. along the vertical direction, in order to generate the portion of a spine in a 2D transformed image. The procedure is repeated within the radius of the spinal column for the left and right half of the rib cage. For rendering a rib the centerline and the up-vectors of the respective rib should be known. Samples of intensity values are taken from the 3D image data in positive and negative direction of the respective up-vectors. The number of sampled intensity values may correspond to twice the respective rib radius. An additional intensity value may be taken at the position of the centerline point. The sampled intensity values are mapped into the straightened configuration, e.g. along the horizontal direction, in order to generate the portion of a spine in a 2D transformed image. For each rib the sampling is repeated for the points of the respective rib centerline.

When rendering the spinal column, it is important that the anatomical connection between the ribs and the vertebrae can be identified in the 3D image data. In order to ensure such an anatomical connection in the 3D image data, the rib centerlines may be extended. A curve, e.g. a cubic spline curve, can be fitted through central, averaged rib centerline points, wherein an averaged rib centerline point is given by averaging the centerline points of an anatomical rib pair, e.g. L1 and R1. The spinal column is then rendered by fitting a curve through corresponding rib centerline points pj,k, which are obtained by keeping the index k constant and varying the rib index j for all ribs Rj on the same side of the rib cage. Along the fitted curve, a fixed number of intensity values are sampled. The sampling points can be equidistantly spaced. The procedure of fitting a curve through corresponding rib centerline points and sampling along the fitted curves is repeated for point indices k in the range $1 \leq k \leq \rho Spine$, where the first rib centerline point closest to the spine has index 1 and $\rho Spine$ corresponds to the radius of the spinal column. The rendering procedure described here thus yields the anatomical connection of the ribs with the vertebrae, which is important to judge whether the rib ordering and pairing is correct.

Figure 8:
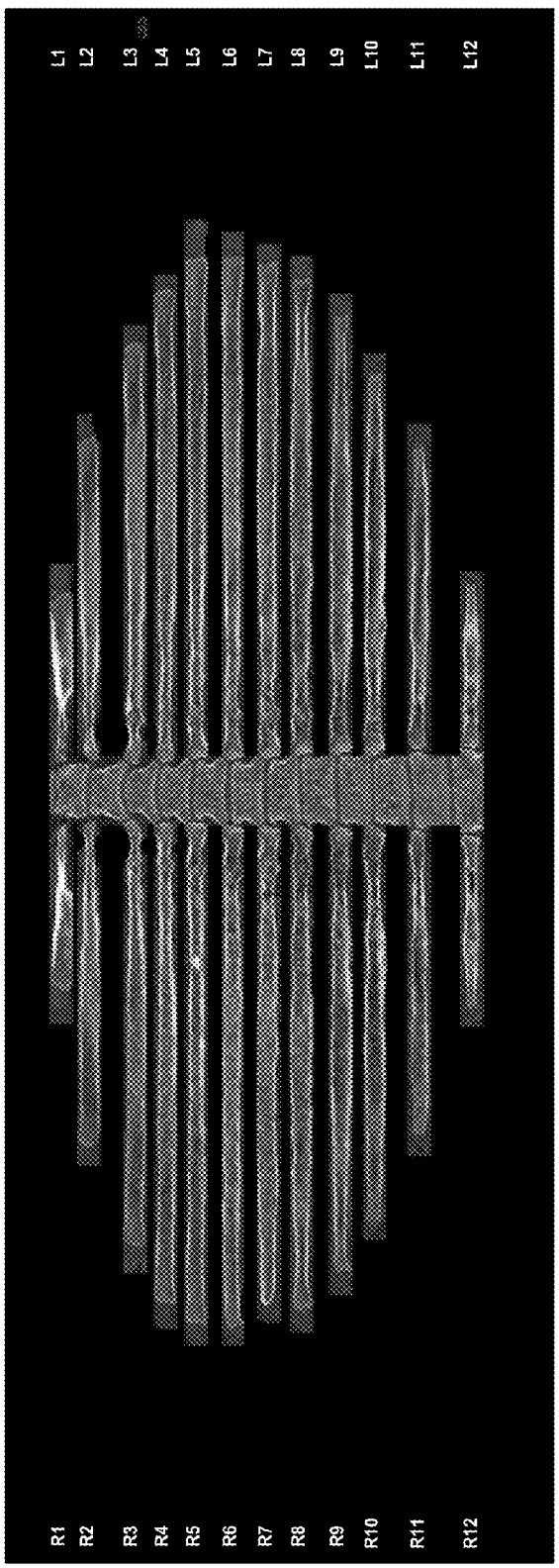
FIG. 8: shows an example of the 2D transformed image.

FIG. 8 shows an example of the 2D transformed image. The plurality of ribs and the portion of a spine are presented in a straightened configuration and the ribs are presented with the same angle of rotation. In FIG. 8 first, anatomical labels are generated for each of the ribs, the labels being placed outside the ribs in the 2D transformed image. The labels R1 . . . R12 on the left side and L1 . . . L12 on the right side of the 2D transformed image shown in FIG. 8 indicate the conventional anatomical numbering. The 2D transformed image shown in FIG. 8 represents the ribs and the portion of a spine in its central position with regard to the anterior-posterior body-axis. In an embodiment of the invention a parameter for the image impression of the 2D transformed image can be changed by a user, e.g. via a graphical user-interface. A parameter for the image impression comprises the contrast of the image, e.g. given by the window, which maps a range of pixel values to a grayscale ramp. Since the portion of a spine and the plurality of ribs can be identified separately from the background, e.g. via segmentation, a constant grayscale value can also be assigned to the background, so that the contrast of the image can be adjusted easily.

Figure 9:
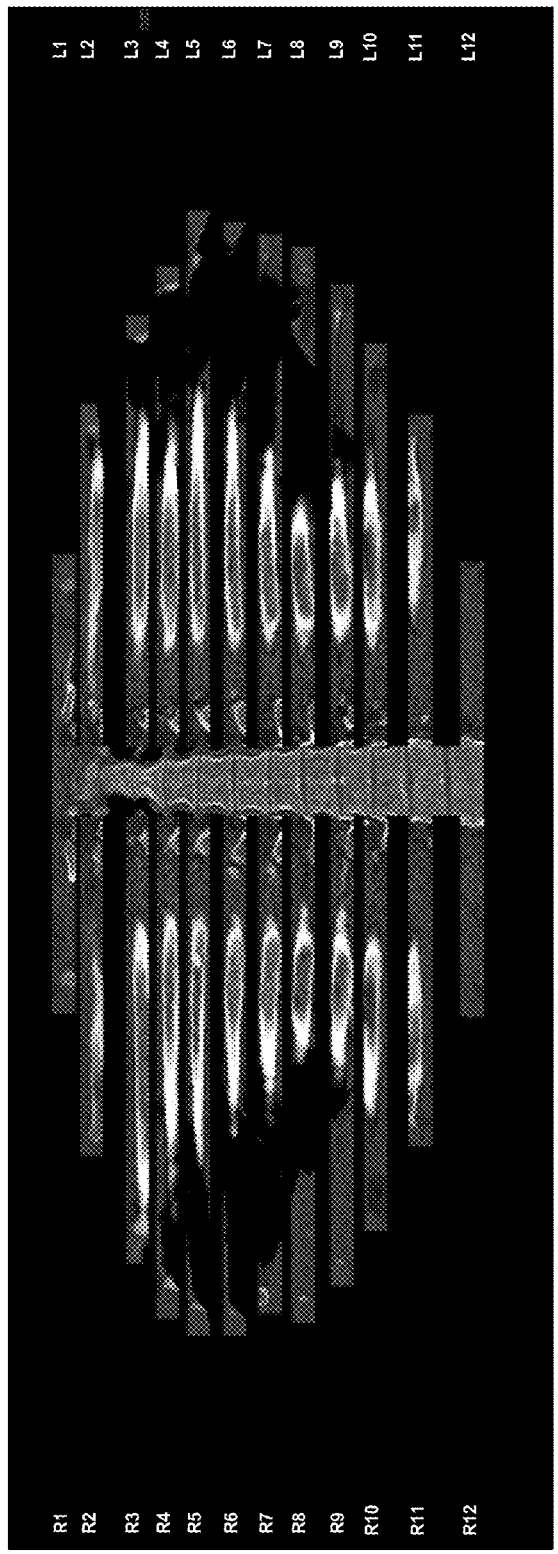
FIG. 9: shows an example of the 2D transformed image shifted in posterior direction.

FIG. 9 shows an example of the 2D transformed image shifted in posterior direction, whereas the angle of rotation is the same for the ribs shown in FIG. 9 compared to the ribs shown in FIG. 8. According to an embodiment of the invention such shifting can be triggered by user interaction. When a 2D transformed image is shifted, this image is updated. In at least one embodiment of the invention a multitude of 2D transformed images are generated, wherein the portion of the spine and the plurality of ribs are shifted towards the anterior or posterior direction. A multitude of 2D transformed images can be saved as a stack, in particular in DICOM format, so that the stack can be stored on a PACS server and accessed and transferred easily. In such a case a single 2D transformed image is also a slice of a stack. Furthermore the range of a parameter for generating a stack may also be predetermined by a user, the parameter being e.g. the displacement in anterior and posterior direction, the number of slices in a stack, the angle of rotation, the step size between different slices in terms of displacement or a change in the angle of rotation.

According to another embodiment of the invention, the angle of rotation of one or several ribs can be changed due to user interaction. When the angle of rotation is changed in a 2D transformed image, this image is updated. The angle of rotation of a rib can be changed by first identifying a rib, e.g. with a user-controlled pointer, and by subsequent scrolling. The speed for rotating the rib and therefore updating the 2D transformed image can be controlled by the speed of scrolling.

Figure 10:
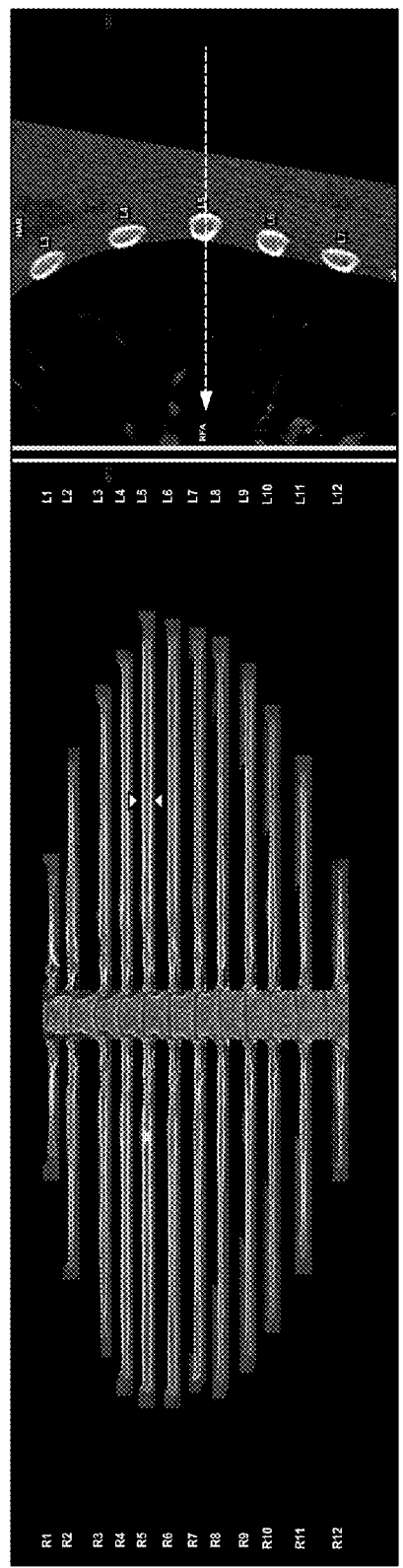
FIG. 10: shows an example of the 2D transformed image with a first angle of rotation displayed simultaneously with a 2D reformatted image.
Figure 11:
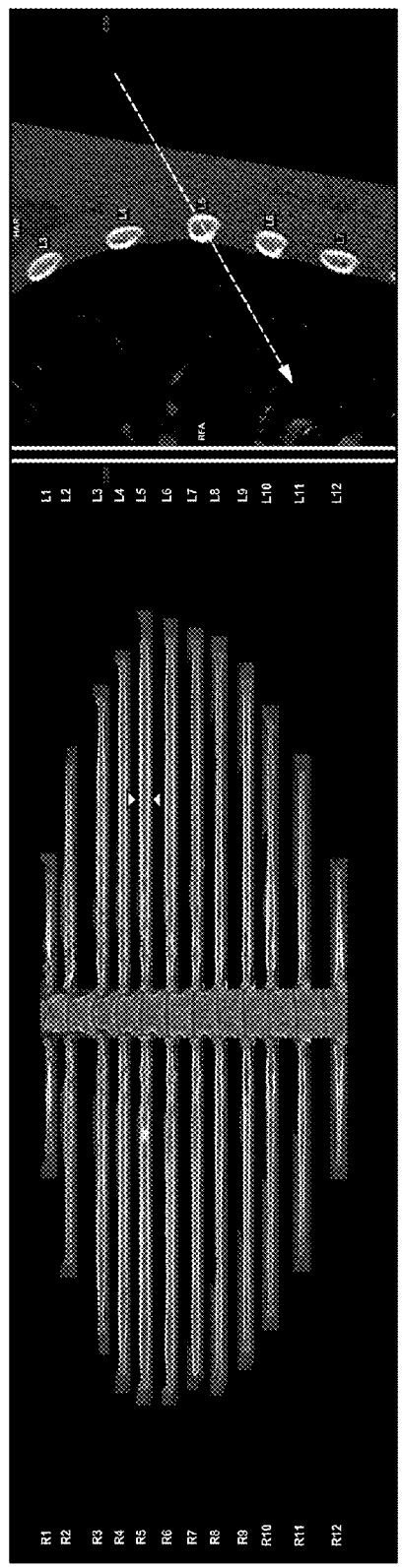
FIG. 11: shows an example of the 2D transformed image with a second angle of rotation displayed simultaneously with a 2D reformatted image.

FIG. 10 and FIG. 11 each show an example of the 2D transformed image with a first angle of rotation displayed simultaneously with a 2D reformatted image, wherein the 2D transformed image is shown on the left and the 2D reformatted image is shown on the right. The angle of rotation differs, however, for one rib between FIG. 10 and FIG. 11. The 2D reformatted images each represents a cross section of at least some of the ribs represented in the 2D transformed images on the left. The cross sections are oriented perpendicular to the long axes of the ribs shown in the 2D transformed images. The position of the cross sections shown in the straightened configuration is indicated by the arrows on the left side. One rib is highlighted by two arrows and the angle of rotation of this rib is indicated by a line in the cross section. Thus, a correspondence between the 2D transformed image and the 2D reformatted image is visualized by two arrows in the 2D transformed images and an elongated arrow in the 2D reformatted image, respectively. Displaying a 2D transformed image and a 2D reformatted image simultaneously allows, therefore, identifying and visualizing the angle of rotation of an individual rib very easily.

In further embodiments of the invention the 2D reformatted image represents a cross section perpendicular to a preselected body-axis, e.g. posterior-anterior, dorsal-ventral or lateral. More than just one 2D reformatted image can be displayed simultaneously with a 2D transformed image, e.g. two 2D reformatted images representing each a cross section perpendicular to the posterior-anterior direction and perpendicular to the dorsal-ventral direction, respectively, can be displayed simultaneously with a 2D transformed image. Furthermore a correspondence between all images displayed simultaneously can be determined, and the correspondence can also be visualized in these images.

In an embodiment of the invention determining the correspondence between the 2D transformed image and the 2D reformatted image is used to facilitate a fast and interactive tool for navigating. If a parameter for determining the correspondence is changed in one of the simultaneously displayed images, then the other images are updated. The angle of rotation may be changed via a graphical user-interface in a 2D transformed image, so that the 2D reformatted image is updated accordingly. "Updating" may refer to generating a new image according to the changed parameter, e.g. the angle of rotation or the shift in the anterior-posterior direction.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims.

Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method of visualization, comprising:
receiving three-dimensional image data representing at least a portion of a spine and a plurality of ribs; and
generating a two-dimensional transformed image based on the three-dimensional image data, the two-dimensional transformed image representing the plurality of ribs and the portion of a spine in a straightened configuration, and an angle of rotation of at least one of the ribs around its long axis being selected from a plurality of angles.

2. The method of claim 1, further comprising:
receiving a centerline of the portion of a spine and receiving a centerline of each of the plurality of ribs, and
determining a correspondence based on the relative position of the centerline of the portion of a spine and of the centerline of at least one of the plurality of ribs, the determined correspondence being used to generate the transformed image.

3. The method of claim 2, further comprising:
determining the correspondence by calculating correspondence points, each correspondence point connecting one of the plurality of ribs with the portion of a spine.

4. The method of claim 1, further comprising:
receiving a centerline of the portion of a spine and receiving a centerline of each of the plurality of ribs, and
determining the long axis of a respective rib in the straightened configuration based on the centerline of the respective same rib.

5. The method of claim 1, further comprising:
receiving a centerline of the portion of a spine and receiving a centerline of each of the plurality of ribs, the centerlines of the plurality of ribs being parallel to each other in the straightened configuration, and the centerline of the portion of a spine and the centerlines of the plurality of ribs being perpendicular to each other in the straightened configuration.

6. The method of claim 1, wherein the angle of rotation is the same for all ribs in the transformed image.

7. The method of claim 1, further comprising:
generating a multitude of two-dimensional transformed images, the angle of rotation being the same for all ribs in one of the transformed images, and the angle of rotation being different in different transformed images.

8. The method of claim 1, further comprising:
generating a multitude of two-dimensional transformed images, each of the transformed images representing the portion of a spine and the plurality of ribs with the same orientation.

9. The method of claim 8, wherein at least some of the transformed images represent the portion of the spine and the plurality of ribs shifted towards the anterior or posterior direction.

10. The method of claim 1, further comprising:
generating a two-dimensional reformatted image based on the three-dimensional image data, the two-dimensional reformatted image representing a cross section of at least a part of the portion of a spine and the plurality of ribs.

11. The method of claim 10, further comprising:
determining a correspondence between image elements of the transformed image and of the reformatted image.

12. The method of claim 11, further comprising:
displaying the transformed image and the reformatted image simultaneously, and
visualizing the correspondence in the transformed image and in the reformatted image.

13. The method of claim 1, further comprising:
generating a first, anatomical label for each of the ribs represented in the transformed image, the labels being placed outside the ribs in the transformed image.

14. The method of claim 1, further comprising:
generating a second label for highlighting an image-based feature of at least one of the ribs in the transformed image.

15. A computation unit for visualization, comprising:
a program memory configured to store program code, the program code being present in the program memory and carrying out, when executed,
receiving three-dimensional image data representing at least a portion of a spine and a plurality of ribs, and
generating a two-dimensional transformed image based on the three-dimensional image data, the two-dimensional transformed image representing the plurality of ribs and the portion of a spine in a straightened configuration, and the angle of rotation of at least one of the ribs around its long axis being selected from a plurality of angles.

16. A medical imaging device comprising the computation unit of claim 15.

17. A non-transitory computer readable medium including program segments for, when executed on a computer device, causing the computer device to carry out the method of claim 1.

18. A computer program product, comprising program code segments of a computer program stored on a non-transitory computer-readable data carrier to execute the method of claim 1 when the computer program is executed on a computer.

19. A system comprising:
a computation unit; and
a displaying unit configured for visualization, wherein the computation unit comprises a program memory configured to store program code, the program code being present in the program memory and being configured to carry out, when executed,
receiving three-dimensional image data representing at least a portion of a spine and a plurality of ribs, and
generating a two-dimensional transformed image based on the three-dimensional image data, the two-dimensional transformed image representing the plurality of ribs and the portion of a spine in a straightened configuration, the angle of rotation of at least one of the ribs around its long axis being selected from a plurality of angles,
wherein the displaying unit is configured to receive the transformed image from the computation unit and wherein the displaying unit is further configured to display the transformed image.

20. The system of claim 19, wherein the computation unit is configured to obtain instructions via a user-interface.

21. The system of claim 19, wherein the computation unit is configured to act as a server and the displaying unit is configured to act as a client, and wherein the displaying unit is configured to receive the transformed image from the computation unit via a network connection.

* * * * *